G. MACLOSKIE AND C. A. IVES.
COMBINED CAR DOOR CONTROL AND AIR BRAKE EQUIPMENT.
APPLICATION FILED NOV. 7, 1921.

1,431,477.

Patented Oct. 10, 1922.
2 SHEETS—SHEET 1.

Inventors:
George Macloskie,
Charles A. Ives,
by *Albert G. Davis*
Their Attorney.

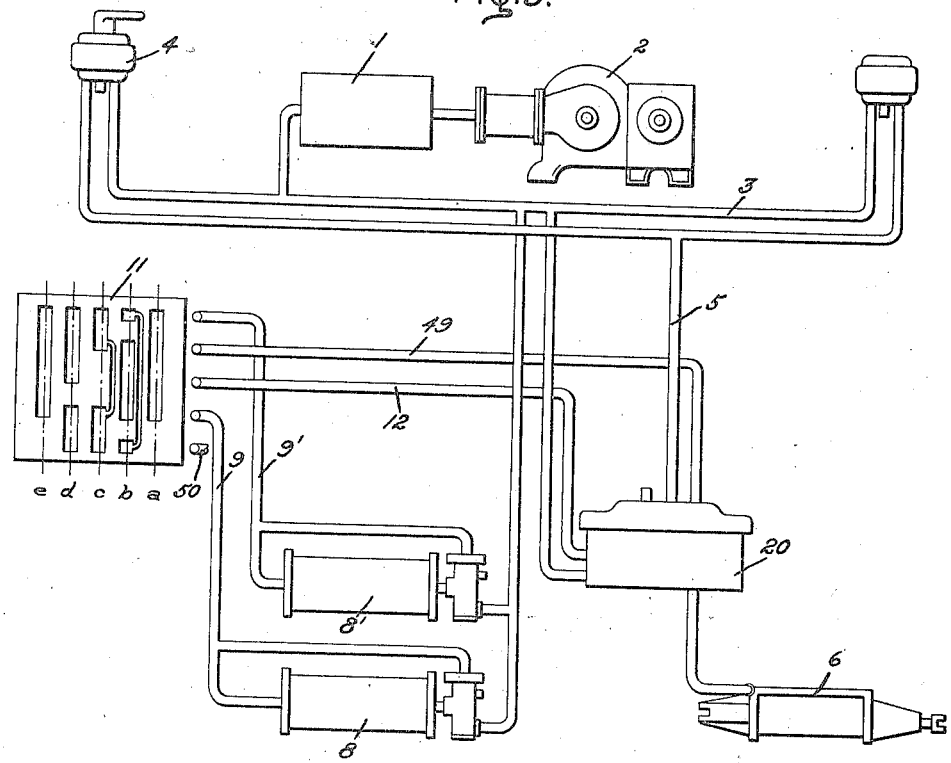

Patented Oct. 10, 1922.

1,431,477

UNITED STATES PATENT OFFICE.

GEORGE MACLOSKIE AND CHARLES A. IVES, OF ERIE, PENNSYLVANIA, ASSIGNORS TO GENERAL ELECTRIC COMPANY, A CORPORATION OF NEW YORK.

COMBINED CAR-DOOR CONTROL AND AIR-BRAKE EQUIPMENT.

Application filed November 7, 1921. Serial No. 513,266.

*To all whom it may concern:*

Be it known that we, GEORGE MACLOSKIE and CHARLES A. IVES, citizens of the United States, residing at Erie, county of Erie, State of Pennsylvania, have invented certain new and useful Improvements in Combined Car-Door Control and Air-Brake Equipments, of which the following is a specification.

Our invention relates to combined car door control and air brake equipments and the object of our invention is to provide an interlocking arrangement whereby the car doors cannot be opened until the brakes are applied and the brakes cannot be released until the car doors are closed.

Our invention will be better understood from the following description taken in connection with the accompanying drawings, and its scope will be pointed out in the appended claims.

Figure 1:
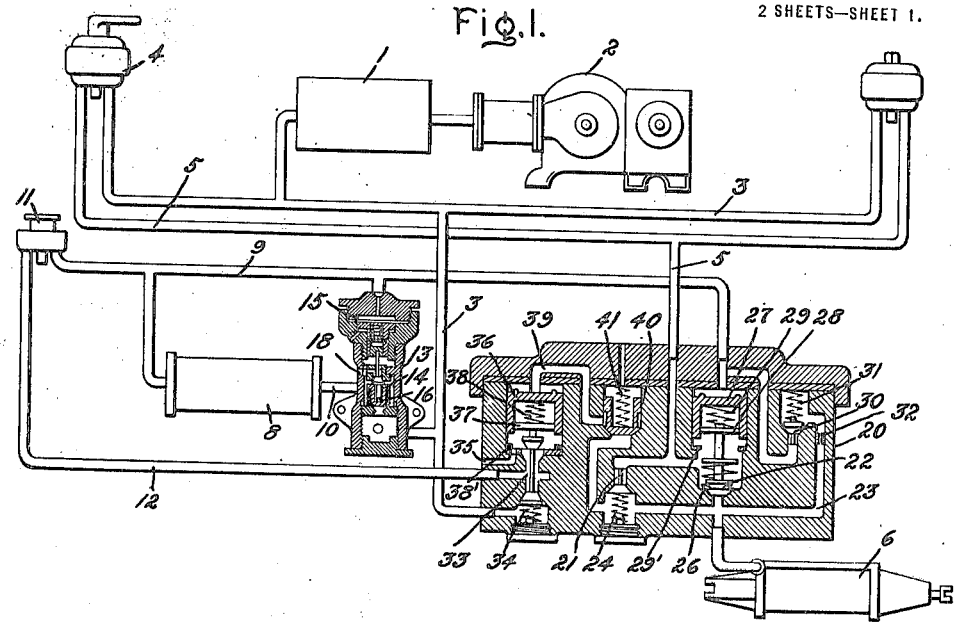
Figure 2:
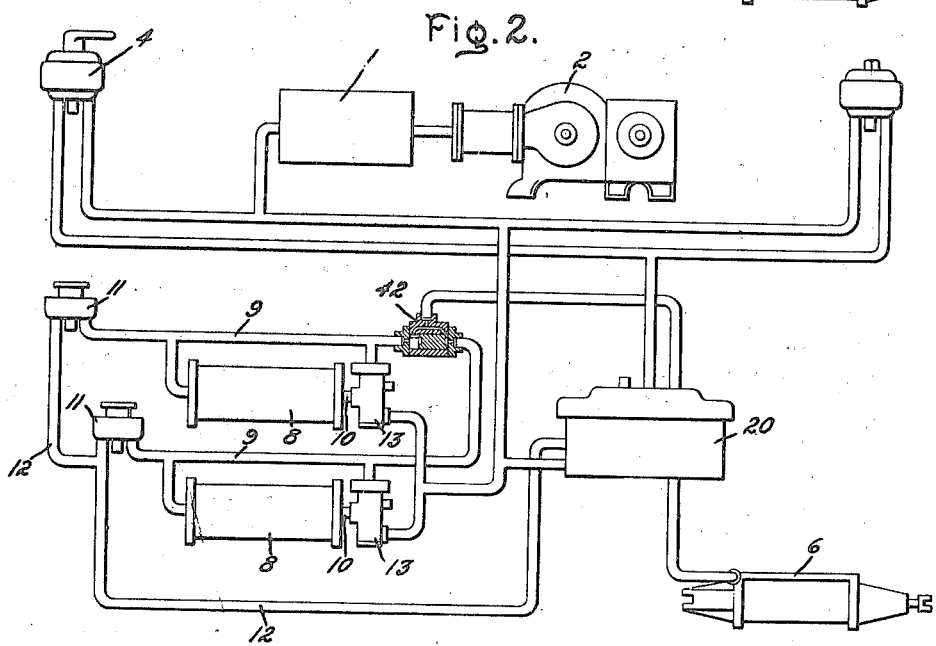

Referring to the accompanying drawings, Fig. 1 is a diagrammatic view of a car door control and straight air brake equipment embodying our invention; and Figs. 2 and 3 are modifications of the embodiment of our invention shown in Fig. 1.

Referring to Fig. 1, 1 represents a reservoir supplied with fluid pressure from a compressor 2 and connected to a main reservoir pipe 3 of a straight air brake system. We wish it to be understood, however, that our invention is not limited to a straight air brake system as it will be obvious to one skilled in the art that it is applicable to any other type of air brake system.

4 represents a motorman's brake valve for controlling the supply and release of fluid pressure to the straight air pipe 5 which is connected to the brake cylinder 6. The brake valve 4 may be of any suitable construction so that in its application position it connects the main reservoir pipe 3 to the straight air pipe 5 and in its release position it connects the straight air pipe 5 to atmosphere.

8 represents a door engine which is provided with the door opening pipe 9 and the door closing pipe 10. The door engine is arranged so that when fluid under pressure is admitted to the door opening side thereof and the door closing side is connected to atmosphere, the door engine operates to open the car doors controlled thereby and when fluid under pressure is admitted to the door closing side and the door opening side is connected to atmosphere the door engine operates to close the car doors controlled thereby. The supply of fluid pressure to the door opening pipe 9 is controlled by a manually operated door valve 11 which is so arranged that it connects the door opening pipe 9 to the door pipe 12 in its door opening position and connects the door opening pipe 9 to atmosphere in its door closing position. The door closing pipe 10 is normally connected to the main reservoir pipe 3 by means of a door operating valve 13. This door operating valve comprises a double beat valve 14 operated by a diaphragm 15, one side of which is subject to the pressure in the door opening pipe 9 and the other side of which is subject to atmosphere. When there is no pressure in the door opening pipe 9 the valve 14 is held in the position shown by means of a spring 16 in which position it establishes communication between the main reservoir pipe 3 and the door closing pipe 10. When fluid under pressure is admitted to the door opening pipe 9 the diaphragm 15 is moved downwardly and the double beat valve 14 cuts off communication between the main reservoir pipe 3 and the door closing pipe 10 and establishes communication between the door closing pipe 10 and atmosphere.

For interlocking the air brakes and the car doors so that the doors can be opened only when the brakes are applied and the brakes cannot be released when the doors are opened, we provide the interlocking valve device 20. This valve device 20 comprises a check valve 21 and a lift valve 22 which controls the communication between the straight air pipe 5 and the passage 23 which is connected to the brake cylinder 6. The check valve 21 is normally held in its closed position by a spring 24. This valve, however, is arranged so that it opens and establishes communication between the straight air pipe 5 and the brake cylinder passage 23 when the pressure in the straight air pipe exceeds the pressure in the brake cylinder by a predetermined amount. The valve 22 is normally held in its open position by means of a spring 26. This valve is controlled by means of the telescoping piston 27 which is connected to the valve 22 by a piston stem 28 and a spring 29 which is interposed between the piston and the stem so that when the piston moves down and seats the valve, the piston can travel a small distance further and seat against the leather gasket 29' thereby preventing any leakage around the piston. One side of the piston 27 is subject to the pressure in the door opening pipe 9 and the other side is subject to the pressure in the straight air pipe 5. A check valve 30 controls the communication between the door opening pipe 9 and the brake cylinder passage 23. This valve 30 is normally held in its closed position by means of a spring 31 and is arranged to open and establish communication between the door opening pipe 9 and the brake cylinder passage 23 through a restricted port 32 when the pressure in the door opening pipe exceeds the pressure in the brake cylinder passage 23.

The interlocking valve 20 is also provided with a double beat valve 33 which controls the connections of the door pipe 12. This valve is normally held in the position shown in the drawing by a spring 34 so that communication is cut off between the main reservoir pipe 3 and the door pipe 12 and communication is established between the door pipe 12 and the exhaust port 35. The double beat valve 33 is controlled by means of a telescoping piston 36 which is connected to the valve 33 by a piston stem 37 and a spring 38 which is interposed between the piston and the stem so that when the piston moves down and seats the valve, the piston can travel a small distance further and seat against the leather gasket 38' thereby preventing any leakage around the piston. One side of the piston 36 is subject to the pressure in a passage 39 and the other side is subject to atmospheric pressure so that when fluid pressure is supplied to this passage the piston 36 moves down and operates the double beat valve 33 so that it cuts off communication between the door pipe 12 and the exhaust port 35 and establishes communication between the main reservoir pipe 3 and the door pipe 12.

The supply of fluid pressure to the passage 39 is controlled by means of a loaded valve 40 which is normally held in its closed position by means of a spring 41. One side of the valve 40 is subject to atmospheric pressure and a portion of the other side is subject to the pressure in the brake cylinder passage 23 and another portion of the latter side is subject to the pressure in the passage 39. This valve 40 is arranged to establish communication between the brake cylinder passage 23 and the passage 39 when the brake cylinder pressure reaches a predetermined value.

The operation of the embodiment of our invention shown in Fig. 1 is as follows: The air brakes are applied and released in the usual manner by means of the brake valve 4. When the brakes are released the interlocking valve 20 is in the position shown. The doors are then in their closed position since fluid pressure is supplied from the main reservoir pipe 3 through the door operating valve 13 to the door closing pipe 10 and the door opening pipe 9 is connected either directly to atmosphere by the door valve 11 if it is in its door closing position or to atmosphere by means of the door pipe 12, the double beat valve 33 and the exhaust port 35 if the door valve 11 is in its door opening position. It is, therefore, evident that the doors cannot be open while the brakes are off.

When the brakes are applied fluid is supplied through the straight air pipe 5 and the brake cylinder passage 23 to the brake cylinder 6. If the brake cylinder pressure builds up to a predetermined value the loaded valve 40 opens and establishes communication between the brake cylinder passage 23 and the passage 39. Piston 36 then moves down and operates the double beat valve 33 to establish communication between the main reservoir pipe 3 and the door pipe 12 and to cut off communication between the door pipe 12 and the exhaust port 35.

The doors may now be opened by moving the door valve 11 to its door opening position so that communication is established between the door pipe 12 and the door opening pipe 9 and the pressure in the door opening pipe builds up so that it is equal to the pressure in the main reservoir pipe. The fluid pressure in the door opening pipe 9 causes the diaphragm 15 of the door operating valve 13 to move downwardly so that the double beat valve 14 cuts off communication between the main reservoir pipe 3 and the door closing pipe 10 and establishes communication between the door closing pipe 10 and the exhaust port 18. The door engine 8 then operates to open the doors controlled thereby.

Since the door pipe 12 is not supplied with fluid pressure until the pressure in the brake cylinder is above a predetermined value, it is evident that the car doors can be opened only when the brakes are applied. Since the pressure in the door opening pipe 9 is the same as the pressure in the main reservoir pipe, this pressure also causes the piston 27 to move downwardly, if less than a predetermined straight air application of the brakes is made. This downward movement of the piston closes the valve 22 so that if the brake valve 4 is moved to its release position, in which position the straight air pipe 5 is connected to atmosphere, the fluid pressure in the brake cylinder is not exhausted. Consequently, the brakes cannot be released while the doors are open.

The check valve 21 permits fluid to flow from the straight air pipe 5 to the brake cylinder passage 23 so as to maintain the brake cylinder pressure against leakage while the brake valve is in its application position and the doors are opened. If, however, the brake valve is moved to its release position so that the supply of fluid pressure to the straight air pipe 5 is cut off while the doors are open the brake cylinder pressure is still maintained by means of check valve 30 which establishes communication between the door opening pipe 9 and the brake cylinder passage 23 through the restricted passage 32.

When the door valve 11 is moved to its door closing position to close the car doors the door opening pipe 9 is connected to atmosphere so that the valve 22 operates and establishes communication between the straight air pipe 5 and the brake cylinder passage 23. The brakes may then be released by moving the brake valve 4 to its release position, in which position the straight air pipe is connected to atmosphere. When the pressure in the brake cylinder decreases below a predetermined value, the double beat valve 33 and the loaded valve 40 return to their normal positions. The reduction in pressure in the door opening pipe produced by moving the door valve 11 to its door closing position allows the spring 16 to move the double beat valve 14 into its normal position, in which position the door closing pipe 10 is connected to the main reservoir pipe 3. Consequently the door engine 8 operates to close the doors controlled thereby.

In the modification of our invention shown in Fig. 2, the interlocking valve 20 is used with two door engines which are independently controlled by separate door valves. In order to prevent both door engines from being moved to their door opening positions when either one of the door valves is moved into its door opening position a double check valve 42 is connected in the door opening pipe 9. This double check valve 42 is so arranged that when fluid is supplied to the branch of the door opening pipe 9 which extends to one of the door valves, the double check valve establishes communication between this branch of the door opening pipe and the branch that extends to the interlocking valve 20 and cuts off communication between the branch of the door opening pipe that extends to the other door valve 11 and the branch of the door opening pipe that extends to the interlocking valve 20. The rest of the system shown in this figure is the same as the embodiment shown in Fig. 1 and therefore further description thereof is deemed unnecessary.

Fig. 3 shows a modification of our invention in which the interlocking valve 20 is used with an air brake system and with two door engines arranged so that either one or both engines may be operated by means of a single door control valve 11. The door control valve 11, a development of which is shown in the drawing, is provided with five positions. In its positions $a$ and $e$ it connects the door pipe 12 to the pipe 49 which supplies fluid pressure to the piston 27 (Fig. 1) of the interlocking valve to cut off communication between the straight air pipe 5 and the brake cylinder 6 and also connects the door pipe 12 to the door opening pipes 9 and 9' of the door engines 8 and 8', respectively, so that both of these door engines are operated to open the doors controlled thereby when the brakes are applied. In position $b$ the door control valve 11 connects the door pipe 12 to the pipe 49 and to the door opening pipe 9 of the door engine 8 and also connects the door pipe 9' of the door engine 8' to the exhaust pipe 50. Consequently, only the door engine 8 operates to open the doors when the brakes are applied and the door control valve is in position $b$. In position $c$ the door control valve 11 connects the door opening pipes 9 and 9' to the exhaust pipe 50 so that all of the doors are closed. In position $d$ the door control valve connects the door pipe 12 to the pipe 49 and to the door opening pipe 9' of the door engine 8' and connects the door opening pipe 9 to the exhaust port 50 so that only the door engine 8' operates to open the doors when the brakes are applied.

The operation of the rest of the system is the same as in the embodiment of our invention shown in Fig. 1 and therefore a complete description thereof is deemed unnecessary.

While we have shown and described several modifications of our invention, we do not desire to be limited thereto, but seek to cover in the appended claims all those modifications that fall within the true spirit and scope of our invention.

What we claim as new and desire to secure by Letters Patent of the United States, is,—

1. In a combined car door and air brake equipment, the combination with a brake cylinder, a brake valve for controlling the supply of fluid under pressure to the brake cylinder for effecting an application of the brakes, a fluid pressure operated door engine, and a manually operated door valve for controlling the supply of fluid under pressure to said door engine for operating the car doors, of means for preventing the car doors from being opened until the brakes are applied and for preventing the brakes from being released until the car doors are closed.

2. In a combined car door and air brake equipment, the combination with a brake cylinder, a brake valve for controlling the supply of fluid under pressure to the brake cylinder for effecting an application of the brakes, a fluid pressure operated door engine, and a manually operated door valve for controlling the supply of fluid under pressure to said door engine for operating the car doors, of an interlocking valve arranged to cut off the supply of fluid under pressure to said door engine for opening the car doors when the brakes are released and to prevent said brakes from being released while the car doors are open.

3. In a combined car door and air brake equipment, the combination with a brake cylinder, a straight air pipe, a brake valve for controlling the supply of fluid pressure to said brake cylinder through said straight air pipe, a door engine, a door opening pipe, a door pipe, and a manually operated door valve for controlling the supply of fluid from said door pipe to said door opening pipe, of means responsive to the pressure in said brake cylinder for controlling the supply of fluid pressure to said door pipe, and means responsive to fluid pressure in said door opening pipe for controlling the communication between said brake cylinder and said straight air pipe.

4. In a combined car door and air brake equipment, the combination with a brake cylinder, a straight air pipe, a brake valve for controlling the supply of fluid pressure to said brake cylinder through said straight air pipe, a door engine, a door opening pipe, a door pipe, and a manually operated door valve for controlling the supply of fluid from said door pipe to said door opening pipe, of a valve device adapted to be operated when the brake cylinder pressure reaches a predetermined value to supply fluid under pressure to said door pipe, and a valve device adapted to be closed by pressure in said door opening pipe for cutting off communication between said straight air pipe and said brake cylinder.

5. In a combined car door and air brake equipment, the combination with a brake cylinder, a straight air pipe, a brake valve for controlling the supply of fluid pressure to said brake cylinder through said straight air pipe, a door engine, a door opening pipe, a door pipe, and a manually operated door valve for controlling the supply of fluid from said door pipe to said door opening pipe, of a valve device adapted to be operated when the brake cylinder pressure reaches a predetermined value to supply fluid under pressure to said door pipe, a valve device adapted to be closed by pressure in said door opening pipe for cutting off communication between said straight air pipe and said brake cylinder, and means for establishing communication between said straight air pipe and brake cylinder when said last mentioned valve device is closed and the pressure in said straight air pipe exceeds the pressure in said brake cylinder.

6. In a combined car door and air brake equipment, the combination with a brake cylinder, a straight air pipe, a brake valve for controlling the supply of fluid pressure to said brake cylinder through said straight air pipe, a door engine, a door opening pipe, a door pipe, and a manually operated door valve for controlling the supply of fluid from said door pipe to said door opening pipe, of a valve device adapted to be operated when the brake cylinder pressure reaches a predetermined value to supply fluid under pressure to said door pipe, a valve device adapted to be closed by pressure in said door opening pipe for cutting off communication between said straight air pipe and said brake cylinder, and a check valve connected between said straight air pipe and brake cylinder in parallel with said last mentioned valve and arranged to allow fluid pressure to flow only from said straight air pipe to said brake cylinder.

7. In a combined car door and air brake equipment, the combination with a brake cylinder, a straight air pipe, a brake valve for controlling the supply of fluid pressure to said brake cylinder through said straight air pipe, a door engine, a door controlling pipe, and a manually operated door valve for controlling the supply of fluid pressure to said door controlling pipe, of a valve device adapted to be operated by fluid pressure in said door controlling pipe to cut off communication between said straight air pipe and said brake cylinder, and means for establishing communication between said straight air pipe and brake cylinder when said last mentioned valve device is closed and the pressure in said straight air pipe exceeds the pressure in said brake cylinder.

8. In a combined car door and air brake equipment, the combination with a brake cylinder, a straight air pipe, a brake valve for controlling the supply of fluid pressure to said brake cylinder through said straight air pipe, a door engine, a door controlling pipe, and a manually operated door valve for controlling the supply of fluid pressure to said door controlling pipe, of a valve device adapted to be operated by fluid pressure in said door controlling pipe to cut off communication between said straight air pipe and said brake cylinder, and means for establishing communication between said door controlling pipe and said brake cylinder when the pressure in said door opening pipe exceeds the pressure in said brake cylinder.

9. In a combined car door and air brake equipment, the combination with a brake cylinder, a straight air pipe, a brake valve for controlling the supply of fluid pressure to said brake cylinder through said straight air pipe, a door engine, a door opening pipe, and a manually operated door valve for controlling the supply of fluid pressure to said door opening pipe, of a valve device adapted to be closed by pressure in said door opening pipe for cutting off communication between said straight air pipe and said brake cylinder, means for establishing communication between said straight air pipe and brake cylinder when said last mentioned valve device is closed and the pressure in said straight air pipe exceeds the pressure in said brake cylinder, and means for establishing communication between said door opening pipe and said brake cylinder when the pressure in said door opening pipe exceeds the pressure in said brake cylinder.

In witness whereof, we have hereunto set our hands this 4th day of Nov., 1921.

GEORGE MACLOSKIE.
CHARLES A. IVES.